Patented Aug. 25, 1942

2,294,228

UNITED STATES PATENT OFFICE 2,294,228

PLASTICIZED POLYVINYL ACETAL RESIN

Elmer R. Derby, Springfield, Mass., assignor, by mesne assignments, to Monsanto Chemical Company, a corporation of Delaware No Drawing. Application November 2, 1937, Serial No. 172,442

6 Claims. (Cl. 260—36)

My present invention relates to plastic material to be employed as interleaf material in the manufacture of safety glass and the like. As is well known to those skilled in the art, polyvinyl acetal resin, i. e. a material made by condensing an aldehyde with a partially hydrolized polyvinyl acetate such as the resin described in the patent to Morrison et al., Reissue No. 20,430, dated June 29, 1937, appears to be an excellent if not the best material known for the purpose mentioned provided it is mixed with a satisfactory plasticizer but its utilization has been retarded by the difficulty which has been experienced in discovering a plasticizer which will give to the final product the necessary properties.

These resins vary in the proportion of hydroxyl groups and acetate groups which they contain with respect to the acetal. For instance, a satisfactory resin made with formaldehyde contains 82% acetal, 8% hydroxyl groups figured as polyvinyl alcohol and 10% acetate. Another satisfactory resin contains from 0 to 2% acetate, 16 to 20% hydroxyl groups figured as polyvinyl alcohol and the balance acetal formed with butyraldehyde. The different resins of which the foregoing are only two examples have different properties according to the proportion of the three substituents mentioned and the particular aldehyde employed.

In a companion application Serial No. 172,443, filed Nov. 2, 1937, I have described the important discovery that the most satisfactory plasticizer of a given chemical series of plasticizers is that one which is most nearly incompatible with the particular resin employed and yet is miscible with it.

I have also discovered that certain substances, particularly esters, which are not themselves compatible with the resin in the proportions required for good quality plastic for safety glass, can be rendered compatible with polyvinyl acetal resin and will have the effect of plasticizing the resin and of producing a material which is useful for the purposes specified provided there is also present in the mixture a suitable quantity of a second plasticizer which, in the proportion used is miscible both with the resin and the first plasticizer to produce a homogeneous plastic. It will be understood that when I refer to incompatibility of a plasticizer I realize that a very small amount of practically any plasticizer is miscible with these resins; but for safety glass a relatively large proportion of plasticizer is required and as the amount of plasticizer is increased a point is usually reached where further plasticizer refuses to mix homogeneously, instead separating as an oily exudation or tiny droplets causing haze. While the second plasticizer is often miscible in all proportions with the resin I have found quite unexpectedly that in some cases, as in Example 4 below, both plasticizers may be immiscible if used alone in the proportion required for good quality plastic for safety glass but a miscible mixture can be made in which the two plasticizers are so proportioned that the mixture is nearly incompatible in the amount required for good safety glass plastic.

As a result of this discovery I am able to use as plasticizers certain substances which have previously been rejected as plasticizers because of their incompatibility with the resin, also certain substances which have not been thought to be usable as plasticizers. For instance, 30 parts dibutyl diglycollate is incompatible with 100 parts of a polyvinyl acetal resin made with formaldehyde and containing 82% acetal, 8% hydroxyl groups figured as polyvinyl alcohol and 10% acetate, but if phenyl ethyl alcohol is added in sufficient quantity, for example, 15 parts, even 50 parts of dibutyl diglycollate can be used successfully, obtaining miscibility and producing a satisfactory and useful product. For convenience, the plasticizer which is relatively incompatible with the resin may be referred to as the non-compatible plasticizer, and the other as the solvent plasticizer. The following are other specific examples of mixtures embodying my invention:

1. Polyvinyl acetal resin made with formaldehyde and containing about 82% acetal, 8% hydroxyl groups figured as polyvinyl alcohol and 10% acetate, 100 parts, mixed with dibutyl phthalate 40 parts and phenyl ethyl alcohol 40 parts. Dibutyl phthalate is normally incompatible with this polyvinyl acetal resin, but is rendered so by the phenyl ethyl alcohol.

2. The same polyvinyl acetal resin 100 parts, diglycol dibutyrate 50 parts and phenyl ethyl alcohol 2½ to 5 parts. The diglycol dibutyrate is not compatible with the acetal resin at 50 parts but 50 parts may be employed if combined with phenyl ethyl alcohol and the mixture is rendered entirely stable by the presence of 5 parts only of phenyl ethyl alcohol.

3. The same resin 100 parts, diglycol dipropionate 30 parts and butyl carbitol butyrate 30 parts. 60 parts of butyl carbitol butyrate alone are incompatible.

4. A polyvinyl acetal resin made with butyraldehyde and containing 0 to 2% acetate, 16 to 20% hydroxyl groups figured as alcohol and the balance acetal. This resin 100 parts dilauryl phthalate 35 parts and diethylene glycol 5 parts.

5. The same polyvinyl acetal resin 100 parts, dilauryl phthalate 40 parts and dibutyl diglycollate 20 parts. 60 parts of dilauryl phthalate are incompatible.

6. The same resin 100 parts, amyl laurate 35 parts, dibutyl phthalate 25 parts. 35 parts of amyl laurate alone are incompatible with this resin.

7. The same resin 100 parts, butyl laurate 35 parts, dibutyl phthalate 25 parts.

8. The same resin 100 parts, amyl laurate 60 parts, phenyl ethyl alcohol 30 parts. 60 parts of amyl laurate alone, or 60 parts of amyl laurate plus 15 parts of phenyl ethyl alcohol, are incompatible.

9. The same resin 100 parts, butyl laurate 60 parts, phenyl ethyl alcohol 30 parts.

The proportions given above are those which give the most satisfactory final product for the manufacture of safety glass, due regard being had to both the cold break test and the hot break test as judged by dropping a two pound ball at 0° F., and 120° F., respectively, on an assembly made with plastic not less than 0.015 inch nor more than 0.027 inch thick. When used in laminated glass, each of the materials produced in accordance with the foregoing examples gives substantially equal hot and cold break tests. The compositions mentioned give results superior to the present acetate safety glass and fully comparable with the compositions mentioned in the co-pending application mentioned and based on various polyvinyl acetal resins.

The laurates above mentioned may be pure chemical compounds or the esters of cocoanut oil fatty acids, or the esters of cocoanut oil fatty acids from which high boilers have been removed.

I claim:

1. A composition of matter suitable for safety glass interleaf comprising a polyvinyl butyral resin of less than 2% acetate, 16-22% hydroxyl groups figured as alcohol, balance butyral, with 25-35 parts of amyl laurate and 35-25 parts of dibutyl phthalate, said composition of matter when so used giving substantially equal hot and cold break tests.

2. A composition of matter suitable for safety glass interleaf comprising a polyvinyl butyral resin of less than 2% acetate, 16-22% hydroxyl groups figured as alcohol, balance butyral, with 25-35 parts of butyl laurate and 35-25 parts of dibutyl phthalate, said composition of matter when so used giving substantially equal hot and cold break tests.

3. A composition of matter suitable for safety glass interleaf comprising a polyvinyl butyral resin of less than 2% acetate, 16-22% hydroxyl groups figured as alcohol, balance butyral, with 25-35 parts of amyl ester of cocoanut oil fatty acids and 35-25 parts of dibutyl phthalate, said composition of matter when so used giving substantially equal hot and cold break tests.

4. A composition of matter suitable for safety glass interleaf comprising a polyvinyl butyral resin of less than 2% acetate, 16-22% hydroxyl groups figured as alcohol, balance butyral, with 25-35 parts of butyl ester of cocoanut oil fatty acids and 35-25 parts of dibutyl phthalate, said composition of matter when so used giving substantially equal hot and cold break tests.

5. A composition of matter comprising a polyvinyl acetal resin and a mixture of plasticizers comprising dibutyl phthalate and an alkyl laurate, the alkyl part of which contains more than three and less than six carbon atoms, in such proportions as to be effective to yield interleaf for safety glass.

6. A composition of matter comprising a polyvinyl butyraldehyde resin and a mixture of plasticizers comprising dibutyl phthalate and an alkyl laurate, the alkyl part of which contains more than three and less than six carbon atoms, in such proportions as to be effective to yield interleaf for safety glass.

ELMER R. DERBY.